United States Patent [19]
Tanaka

[11] Patent Number: 5,943,036
[45] Date of Patent: Aug. 24, 1999

[54] FLICKER REDUCTION SYSTEM FOR COMPUTER GRAPHICAL INTERLACED DISPLAY

[75] Inventor: Akio Tanaka, 359 Preston Rd., Woodside, Calif. 94062

[73] Assignees: Akio Tanaka; Fumihiro Kozato, both of Woodside, Calif.

[21] Appl. No.: 08/687,666

[22] Filed: Jul. 26, 1996

Related U.S. Application Data

[63] Continuation-in-part of application No. 08/508,293, Jul. 27, 1995, abandoned.

[51] Int. Cl.$^6$ .................................................... G09G 5/36
[52] U.S. Cl. .......................................... 345/136; 345/132
[58] Field of Search ..................................... 345/132, 136, 345/137, 138, 113, 133, 144, 145; 382/266, 267, 268, 269, 274; 348/607, 910

[56] References Cited

U.S. PATENT DOCUMENTS

4,763,120 8/1988 Morrish et al. ......................... 340/748
5,101,440 3/1992 Watanabe et al. ....................... 345/136
5,146,329 9/1992 Flamm .................................... 348/607

*Primary Examiner*—Xiao Wu
*Attorney, Agent, or Firm*—Townsend and Townsend and Crew LLP

[57] ABSTRACT

A flicker reduction system for display of computer graphics on an interlaced display is provided. Under the control of a computer or game system, horizontal lines are analyzed to determine if flicker conditions are present. If flicker conditions exist, a horizontal line may be constrained to occupy a certain field depending on the location of the graphical object relative to other graphical objects. Analyzing flicker conditions allows a flicker-free display to be created without unnecessarily reducing resolution of the display. The flicker conditions may be analyzed whenever a new graphical object is created or when an existing graphical object is moved. Additionally, all horizontal edges may be constrained to being displayed in the same field to reduce flicker.

57 Claims, 9 Drawing Sheets

FLICKER REDUCTION SYSTEM FOR COMPUTER GRAPHICAL INTERLACED DISPLAY

This is a continuation-in-part of application Ser. No. 08/508,293 filed Jul. 27, 1995, now abandoned, which is hereby incorporated by reference for all purposes.

BACKGROUND OF THE INVENTION

The present invention is related to computer graphical display systems and, more particularly, to computer generated graphics that have reduced flicker when displayed on an interlaced display.

Ages ago, people discovered that if multiple still pictures are sequentially flashed to a person, the person saw what appeared to be continuous motion. At a rate of around 50 to 60 frames a second, a person is not able to discern the individual frames and thus perceives continuous motion. Below this rate, the person is able to discern the individual frames which results in "flicker."

Picture flicker is caused by the latency and the lateral inhibition mechanism of the visual neural system. Conventional computer monitors update the frames or the full screen images at a rate fast enough so that a person does not perceive flicker. Computer displays typically are noninterlaced raster scan with a refresh rate of 60–70 frames per second.

There are many instances where the computer generated graphics are displayed on an interlaced display. One reason is that interlaced display monitors are less expensive than noninterlaced display monitors. Additionally, it is now common to use televisions (which are interlaced) for games, presentation graphics, multimedia, program menu selection, and the like. The television standard (NTSC) specifies 30 frames per second where each frame is composed of two interlaced fields with each field being half of the full frame image.

Flicker is generally not a problem on television even though the frame rate is below the flicker threshold because with normal television pictures, the information in one field (e.g., the odd field) has a high level of correlation with the information in the other field (e.g., the even field). However, when a television is used as a display device for computer generated graphics, the images in the two fields usually do not have the high level of correlation which can result in flicker. This is especially true where two horizontal edges which are close to each other reside in different fields.

Past attempts to reduce flicker of computer generated images on televisions or other interlaced display devices have attempted to do so by removing the interlace effect and displaying the odd field in the same position as the even field. However, this approach has the disadvantage of reducing the vertical resolution in half.

The book "Video Demystified" by Keith Jack (HighText, 1993) describes a method where each pixel on the horizontal scan line are a weighted average of the contiguous pixels above and below the scan line in a frame. The weighted average is then output to an interlaced display device. This approach is implemented in Cirrus Logic's GD5425-TV chip. The averaging of horizontal lines removes the high contrast vertical transitions but it also smoothes out the picture. Thus, flicker reduction comes at the price of reduced resolution and flicker is still noticeable in high contrast areas.

As the use of interlaced display devices with computer graphics becomes more and more prevalent, systems and methods are needed that reduce or eliminate flicker while not unnecessarily compromising the display resolution. The present invention fulfills this and other needs.

SUMMARY OF THE INVENTION

The present invention provides systems and methods of reducing or eliminating flicker in an interlaced display device without unnecessarily reducing the display resolution. The present invention provides rules that identify conditions that will cause flicker on an interlaced display device. After a flicker condition is identified, the system or the user modifies the graphical image to avoid the flicker. Since conditions that cause flicker are detected, a truly flicker-free display may be achieved.

In accordance with the present invention, a rule based system is provided for generating flicker-free interlaced display of computer graphics. The system may be interfaced on several levels. Graphic drawing packages may utilize the invention as a design rule check which prevents the creation of objects which will cause flicker or to flag flicker conditions so the user can remove the conditions if desired. At another level with an interactive user (e.g., a windows application or game program), the system may move windows or objects, such as icons or sprites, so that flicker conditions do not occur. For example, an application program or an operating system may incorporate the present invention to restrict how windows and objects are drawn or moved on the display.

A typical system implementing the present invention includes a computer (or game machine), video display hardware which displays the image stored in a video frame buffer (or hardware like sprite hardware) in two interlaced fields, and an interlaced display device for displaying the two fields. The computer or video display hardware may store a set of formal rules specifying conditions that will produce flicker. Whenever an object is created or moved, these rules are referenced and checked. The computer may also store and display objects or images which have been created on another system utilizing the invention.

The formal rules specify conditions which will cause flicker in an interlaced display device. An important condition is that two horizontal edges (e.g., edges of a graphical object) in different fields are in close proximity. Other conditions may include the horizontal overlap of two horizontal edges, the vertical distance between two horizontal edges, and the luminous intensity difference between two horizontal edges and the intervening background.

In one embodiment, if all the conditions indicate that flicker will be produced by two horizontal edges, an object will be moved or resized so that the two horizontal edges will be in the same field. Additionally, a flicker flag may be set so that the application program or user can address the identified flicker condition.

In some embodiments, only a subset of the flicker conditions will be tested. If only a subset of the flicker conditions are tested, the untested conditions are assumed to indicate a flicker condition. In this manner, if all the conditions, both tested and untested, indicate flicker will be produced, the system or user address the identified flicker condition.

In another embodiment, objects (e.g., windows) are created and moved so that all outer horizontal edges of the object that are darker than the background are constrained to be in the same field as the outer horizontal edges of other objects that are darker than the background. Thus, flicker is reduced because all the outer horizontal edges of objects that are darker than the background will be in the same field. Additionally, outer horizontal edges that are lighter than the background may be constrained to the other field.

Other features and advantages of the present invention will become apparent upon a perusal of the remaining portions of the specification and drawings.

DETAILED DESCRIPTION OF PREFERRED EMBODIMENTS

Definitions: The following are definitions of some of the terms used herein.

Scan line—produced by the electron beam as it passes from one side of the raster to the other between horizontal retraces.

Field—set of alternating scan lines in an interlaced display device (e.g., odd or even field).

Horizontal line—resides on one scan line and has a single luminous intensity.

Horizontal strip—object composed of adjacent horizontal lines of the same luminous intensity.

Horizontal edge (or edge)—horizontal line which has at least one adjacent horizontal line of different luminous intensity.

Outer horizontal edge—horizontal edge of an object which defines the top or bottom boundary of the object.

In the description that follows, the present invention will be described in reference to an IBM personal computer system in an MS-DOS or Microsoft Windows environment. The present invention, however, is not limited to any particular environment or any particular application. Instead, those skilled in the art will find that the systems and methods of the present invention may be advantageously applied to a variety of systems, including different platforms of computers, games systems, presentation systems, and graphical overlay systems which combine graphics over video. Therefore, the description the embodiments that follow is for purposes of illustration and not limitation.

Figure 1:
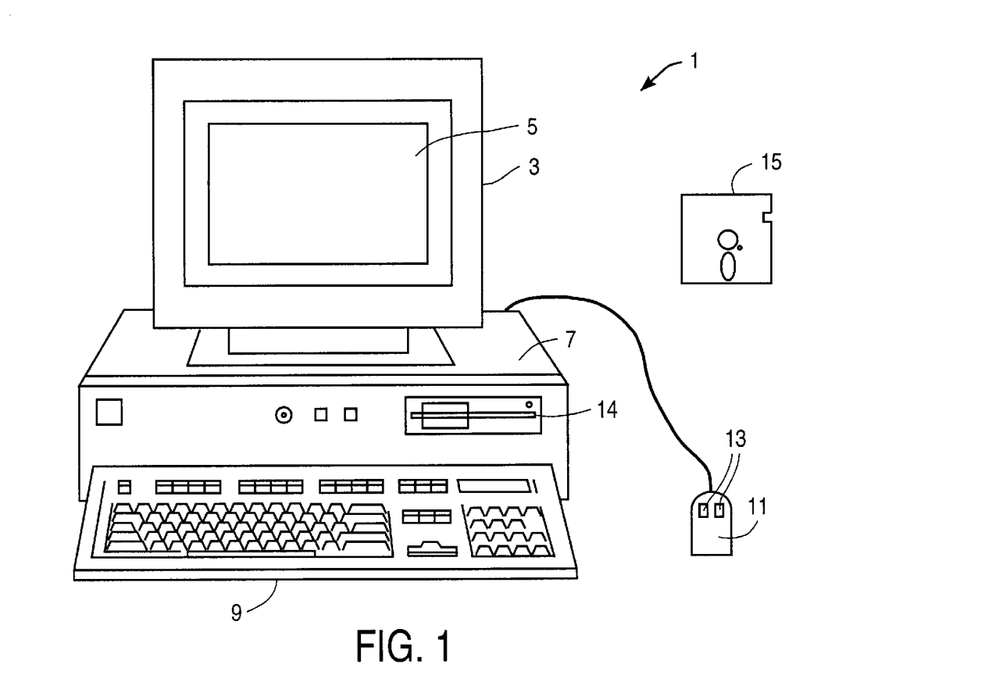
FIG. 1 illustrates an example of a computer system used to execute the software of the present invention.

FIG. 1 illustrates an example of a computer system used to execute the software of the present invention. FIG. 1 shows a computer system 1 which includes a monitor 3, screen 5, cabinet 7, keyboard 9, and mouse 11. Mouse 11 may have one or more buttons such as mouse buttons 13. Cabinet 7 houses a floppy disk drive 14 or a hard drive (not shown) which may be utilized to store and retrieve software programs including computer code incorporating the present invention, graphical images created utilizing the present invention, and the like. Although a floppy disk 15 is shown as a computer readable storage medium, other computer readable storage media including hard disks, CD-ROM, flash memory, RAM, ROM, and tape may be utilized. Cabinet 7 also houses familiar computer components (not shown) such as a processor, memory, and the like.

Figure 2:
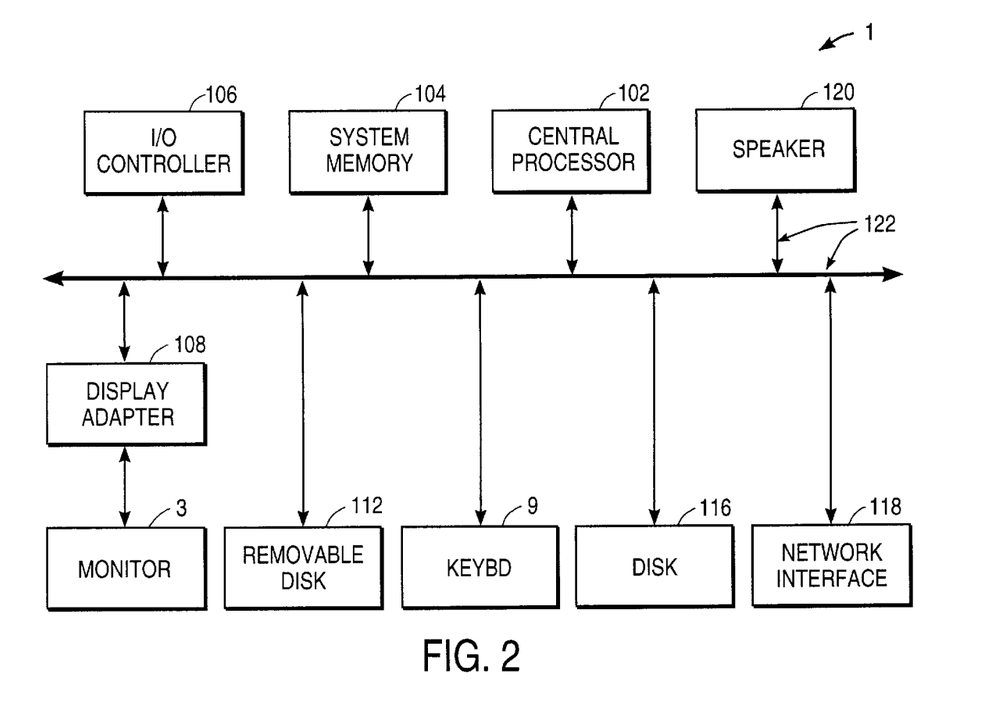
FIG. 2 shows a system block diagram of a typical computer system used to execute the software of the present invention.

FIG. 2 shows a system block diagram of computer system 1 used to execute the software of the present invention. As in FIG. 1, computer system 1 includes monitor 3 and keyboard 9. Computer system 1 further includes subsystems such as a central processor 102, system memory 104, I/O controller 106, display adapter 108, serial port 112, disk 116, network interface 118, and speaker 120. Other computer systems suitable for use with the present invention may include additional or fewer subsystems. For example, another computer system could include more than one processor 102 (i.e., a multi-processor system) or a system may be controlled by a microcomputer.

Arrows such as 122 represent the system bus architecture of computer system 1. However, these arrows are illustrative of any interconnection scheme serving to link the subsystems. For example, speaker 120 could be connected to the other subsystems through a port or have an internal direct connection to central processor 102. Computer system 1 shown in FIG. 2 is but an example of a computer system suitable for user with the present invention. Other configurations of subsystems suitable for use with the present invention will be readily apparent to one of ordinary skill in the art.

Figure 3A:
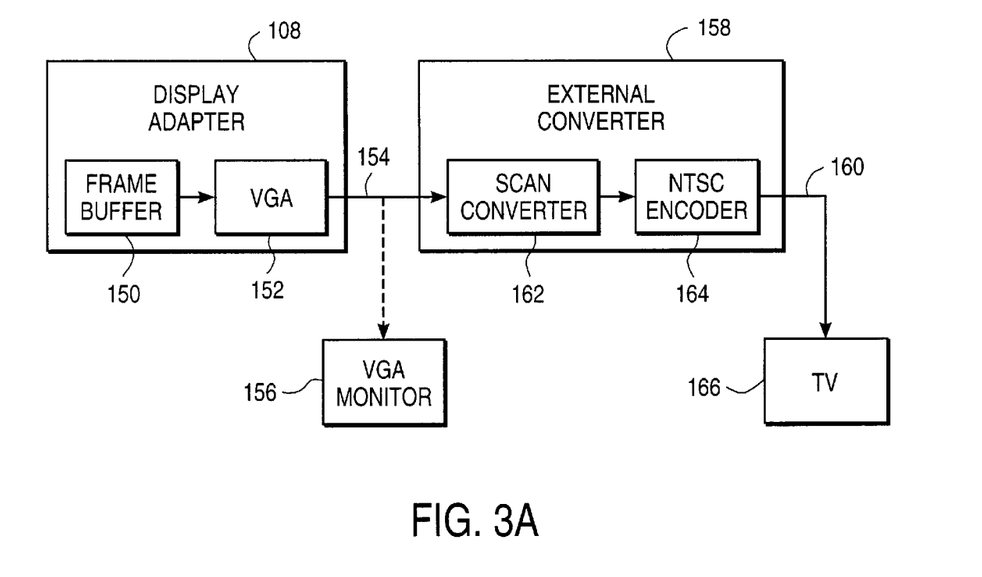
FIG. 3A shows a block diagram of an external scan converter configuration and FIG. 3B shows a block diagram of an internal scan converter configuration.
Figure 3B:
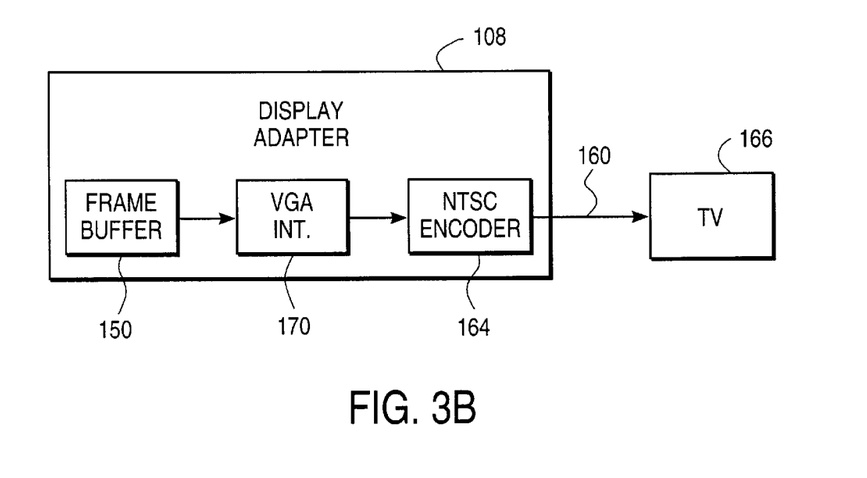

FIGS. 3A and 3B show block diagrams of different computer display hardware that may be used with the present invention. FIG. 3A shows a block diagram of an external scan converter configuration. Display adapter 108 includes a frame buffer 150 and a VGA chip 152. The frame buffer is a block of dedicated memory that stores the screen image displayed on the monitor. A "frame" will be used herein to describe a full screen image. The VGA chip reads data stored the frame buffer and produces a computer monitor signal 154 that produces the screen image on a VGA monitor 156.

In a noninterlaced monitor, a frame is produced on the screen when the scanning electron beam in the monitor sweeps once from top to bottom (i.e., between vertical retraces). However, in an interlaced monitor, only half the frame is produced when the scanning electron beam in the monitor sweeps from top to bottom because only one field is displayed. Therefore, a frame in an interlaced monitor is composed of two fields which are offset from each other vertically by half a scan line. The fields are commonly referred to as the odd and even fields, respectively.

Still referring to FIG. 3A, in a typical computer, display adapter 108 outputs the contents of the frame buffer at a rate compatible with VGA monitor 156. The frame buffer is output in computer monitor signal 154 comprising frames of full screen images. Thus, the computer monitor signal is, in effect, a noninterlaced signal. As an example, a Video Graphics Array (VGA) display adapter may output the frames at a rate of 60 Hertz. However, computer monitor signals are generally incompatible with the standard television signal (NTSC). Therefore, an external scan converter 158 converts the computer monitor signal to a television signal 160.

The external scan converter includes a scan converter 162 that produces an interlaced signal which is input to an NTSC encoder 164. The NTSC encoder produces the television signal that is displayed by a television 166. Television signals are composed of 30 frames a second but since the frames are interlaced, the television has a refresh rate of 60 fields per second.

FIG. 3B shows a block diagram of an internal scan converter configuration. Some display adapters incorporate circuitry that produce television signals. As shown, display adapter 108 includes frame buffer 150, a VGA interlaced chip 170, and NTSC encoder 164. An example of the VGA interlaced chip is Cirrus Logic's GD5425-TV chip. The VGA interlaced chip reads data stored the frame buffer and produces an interlaced signal. The NTSC encoder takes the interlaced signal and produces the television signal that is displayed by television 166. Thus, an internal scan converter provides functionality similar to the external scan converter except that the electronics are located on the display adapter.

In general, the present invention reduces flicker by recognizing the conditions that will cause flicker. In one embodiment, graphical objects are constrained to positions on the screen that will not produce flicker. In another embodiment, graphical objects are analyzed when they are created or moved to determine if flicker will result. Flicker may result if two horizontal edges are in different fields. Thus, a flicker condition is that two horizontal are in different fields. A horizontal edge of a graphical object may be internal or near the periphery (an "outer horizontal edge"). Although the simplest horizontal lines and edges may be a single color, horizontal lines and edges may be dotted or otherwise composed of more than one color. Other flicker conditions include the horizontal overlap of the horizontal edges, the vertical distance between the horizontal edges, and the luminous intensity difference between two horizontal edges and the intervening background.

If all of the flicker conditions indicate (e.g., by crossing a threshold value) flicker will occur, one of the horizontal edges may be displayed in a different field (i.e., same field as the other horizontal edges) to avoid the flicker. This eliminates the flicker while not unnecessarily lowering the resolution.

In general, the thresholds for the flicker conditions are mutually dependent and may be determined by psychometric measurement. The thresholds for the flicker conditions may be stated as dependent functions, stored in a table or set as constants. Different applications of the present invention may utilize different threshold values. Additionally, not all the flicker conditions need be tested. For example, if an application displays black bordered windows on a white background, it may not be necessary to test the chroma-luminance intensity flicker condition.

For illustration purposes, the present invention will now be described as being implemented in a computer system that displays graphical windows on an interlaced screen. As a graphical window is created or moved, the system checks to see if the graphical window will produce flicker. If the system determines the graphical window will produce flicker, the system will move or resize the graphical window such that flicker will not be produced. Although the present invention will be described as being applied to the outer horizontal edges of each graphical window as it is created or moved, it may also be utilized to reduce flicker by analyzing the internal horizontal edges of graphical objects, images, windows or whole screens.

Figure 4:
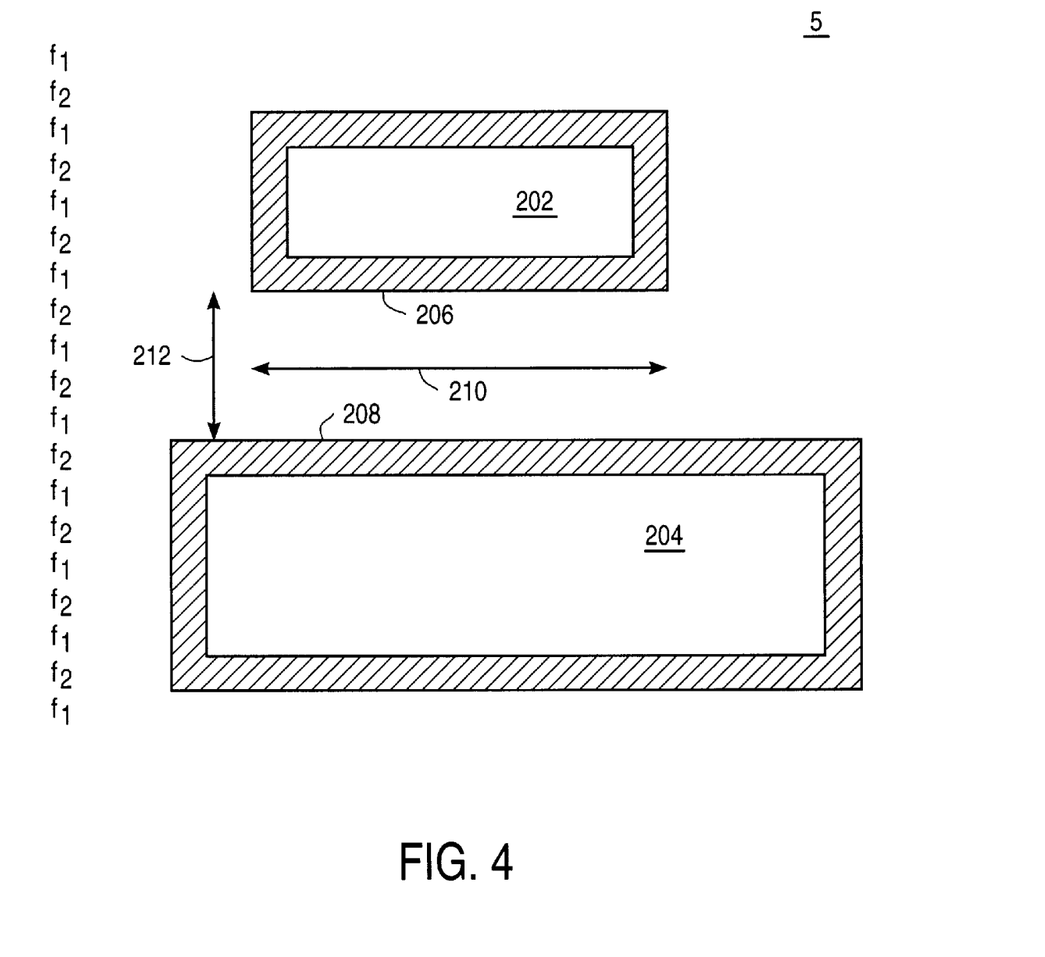
FIG. 4 is a screen including two graphical windows to illustrate flicker conditions.

FIG. 4 is a screen including two simple graphical windows to illustrate flicker conditions. Screen 5 is an interlaced screen composed of two fields denoted $f_1$ and $f_2$. The screen includes graphical windows 202 and 204. When graphical windows or objects are analyzed, the horizontal edges nearest another graphical window or object are compared. Thus, graphical window 202 includes a horizontal edge 206 that is nearest graphical window 204. Similarly, graphical window 204 includes a horizontal edge 208 that is nearest graphical window 202. These two edges are analyzed to determine if the edges will meet conditions indicative of flicker.

Flicker will not be caused by two horizontal edges that are in the same field. As horizontal edge 206 is in field $f_1$ and horizontal edge 208 is in field $f_2$, there is a possibility of flicker and one flicker condition has been satisfied. Another flicker condition is if a horizontal overlap 210 of the two horizontal edges is greater than a threshold value. Yet another flicker condition is if a vertical proximity 212 of the horizontal edges is less than a threshold value. An additional flicker condition is if the luminous intensity of both edges are greater than a threshold value above (or below) the intervening background luminous intensity. If all these flicker conditions are satisfied, the edges might cause flicker.

When the conditions indicate that the horizontal edges will cause flicker, the system may remove the possibility of flicker by displaying a horizontal edge in a different field. Thus, flicker may be avoided by displaying both horizontal edges in the same field. This may be accomplished by moving or resizing an object or window. Optionally, horizontal edges that are not longer than a certain length are not analyzed because the flicker produced is negligible.

Although the present invention has been described in terms of luminous intensity, chroma-luminance may also be utilized. Chroma-luminance refers to both the color and luminance of the horizontal line, edge or strip. Thus, in one embodiment, a flicker condition is determined by subtracting the intervening background chroma-luminance from the chroma-luminance of the two horizontal edges at issue. If the signs of these differences are the same, the magnitude (absolute value) of the differences are compared to a threshold value. If the magnitude of both differences are above the threshold value, flicker may result. In another embodiment, flicker is indicated if the signs of the differences are the same (i.e., no threshold value is utilized).

Not all the flicker conditions need be tested. For example, if one is creating multiple borders for windows, the test may be simplified to determining if the intensity differences between the horizontal strip and the two adjacent backgrounds have the same sign (i.e., the bordering backgrounds are either both lighter or darker than the horizontal strip). Such horizontal strips may be constrained to an odd number of scan lines.

Figure 5:
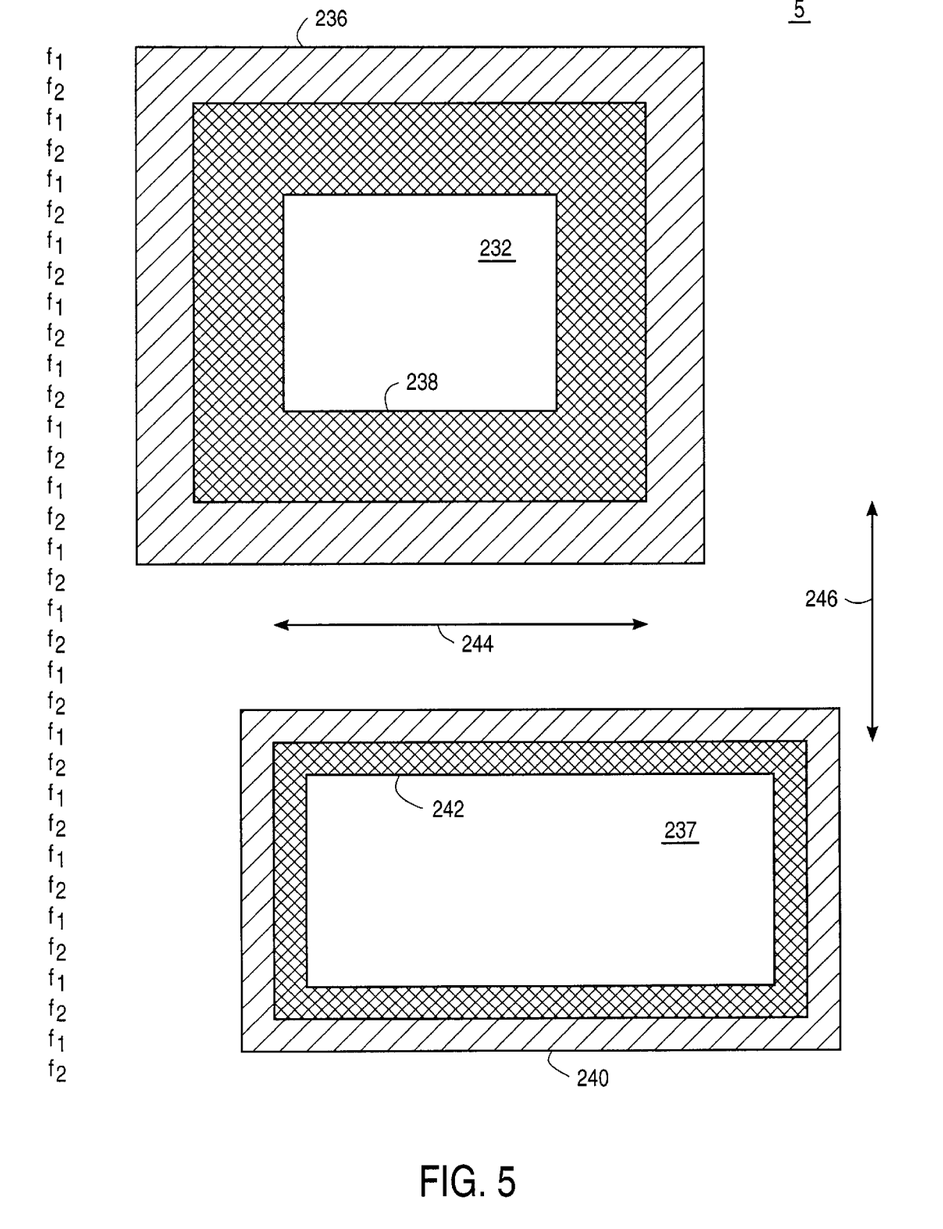
FIG. 5 is a screen including two graphical windows having multiple borders.

FIG. 5 is a screen including two graphical windows having multiple borders. Screen 5 is an interlaced screen composed of two fields denoted $f_1$ and $f_2$. The screen has a white background and includes graphical windows 232 and 234. Each graphical window is bordered by light gray and has an inner border of black. Graphical window 232 has a light gray border 236 and a black inner border 238. Similarly, graphical window 234 has a light gray border 240 and a black inner border 242.

The light gray borders of the graphical windows may not produce flicker because their luminous intensity is close to the luminous intensity of the intervening white background. However, the inner black borders of the graphical windows may produce flicker since they have edges that are in different fields. Black inner border 238 has a horizontal overlap 244 with black inner border 242. The black inner borders have a vertical proximity 246. The horizontal overlap and vertical proximity may be compared to threshold values to determine if flicker is indicated.

A flicker condition is if the differences between the luminous intensity of both edges and the intervening background luminous intensity are the same sign and the absolute value of the differences are both greater than a threshold value. Although the edges of the black inner borders are separated by the white background and the light gray border, flicker will be indicated if both edges have a luminous intensity greater than a threshold value above (or below) each intervening luminous intensity. Thus, the horizontal edges in windows or objects that produce flicker may be internal horizontal edges.

For illustration purposes, FIG. 5 has been described as having black borders on a white background. It should be readily apparent that the same analysis would apply to a light border on a dark background and a dark border on a light background. Furthermore, the present invention is not limited to black and white colors, these colors are chosen to simply the reader's understanding but in a preferred embodiment the present invention analyzes the chroma-luminance which includes both the color and intensity of the edges.

Figure 6:
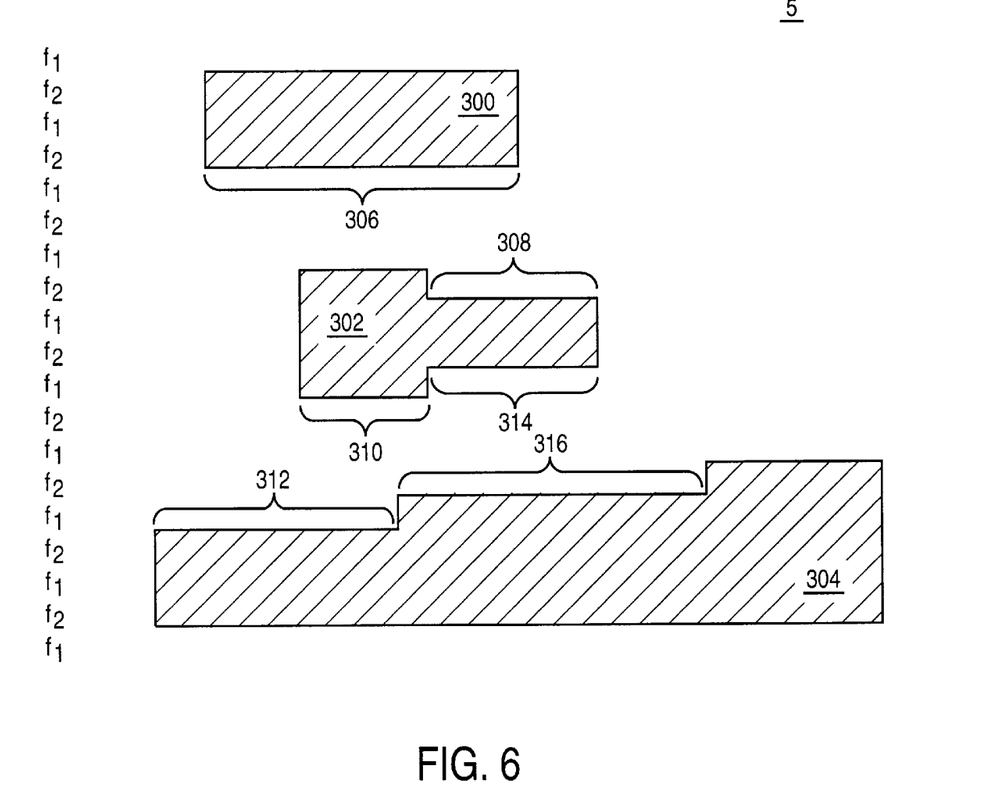
FIG. 6 is a screen including three graphical objects.

Graphical objects are typically more complicated than the rectangular graphical windows shown in FIGS. 4 and 5. However, all graphical objects include horizontal edges that may be analyzed individually. FIG. 6 is a screen including three more complicated graphical objects. Screen 5 includes graphical objects 300, 302 and 304. If graphical object 302 was just created or moved to its current position on the screen, the system would check if the graphical object would produce flicker. The top and bottom of graphical object 302 would be reduced to horizontal edges and the edges analyzed to determine if the edges would interact with neighboring edges to produce flicker.

Graphical object 300 includes a horizontal edge 306. Horizontal edge 306 is compared to a horizontal edge 308 of graphical object 308 because the horizontal edges are in different fields and overlap. Similarly, a horizontal edge 310 is compared to a horizontal edge 312 because the horizontal edges are in different fields and overlap. Additionally, a horizontal edge 314 is compared to a horizontal edge 316 because the horizontal edges are in different fields and overlap. Therefore, the top and bottom of graphical objects are reduced to horizontal edges for analysis.

Internal and outer horizontal edges of graphical objects may interact to produce flicker. Additionally, horizontal edges of a graphical object may act as the top and bottom of a horizontal strip that results in flicker. For example, in FIG. 6 horizontal edge of graphical object 304 define a horizontal strip. The horizontal edges in the background above and below this strip may interact to produce flicker because these horizontal edges in the background are in different fields. In other words, a horizontal strip with a vertical height of an even number of scan lines may generate flicker.

Figure 7:
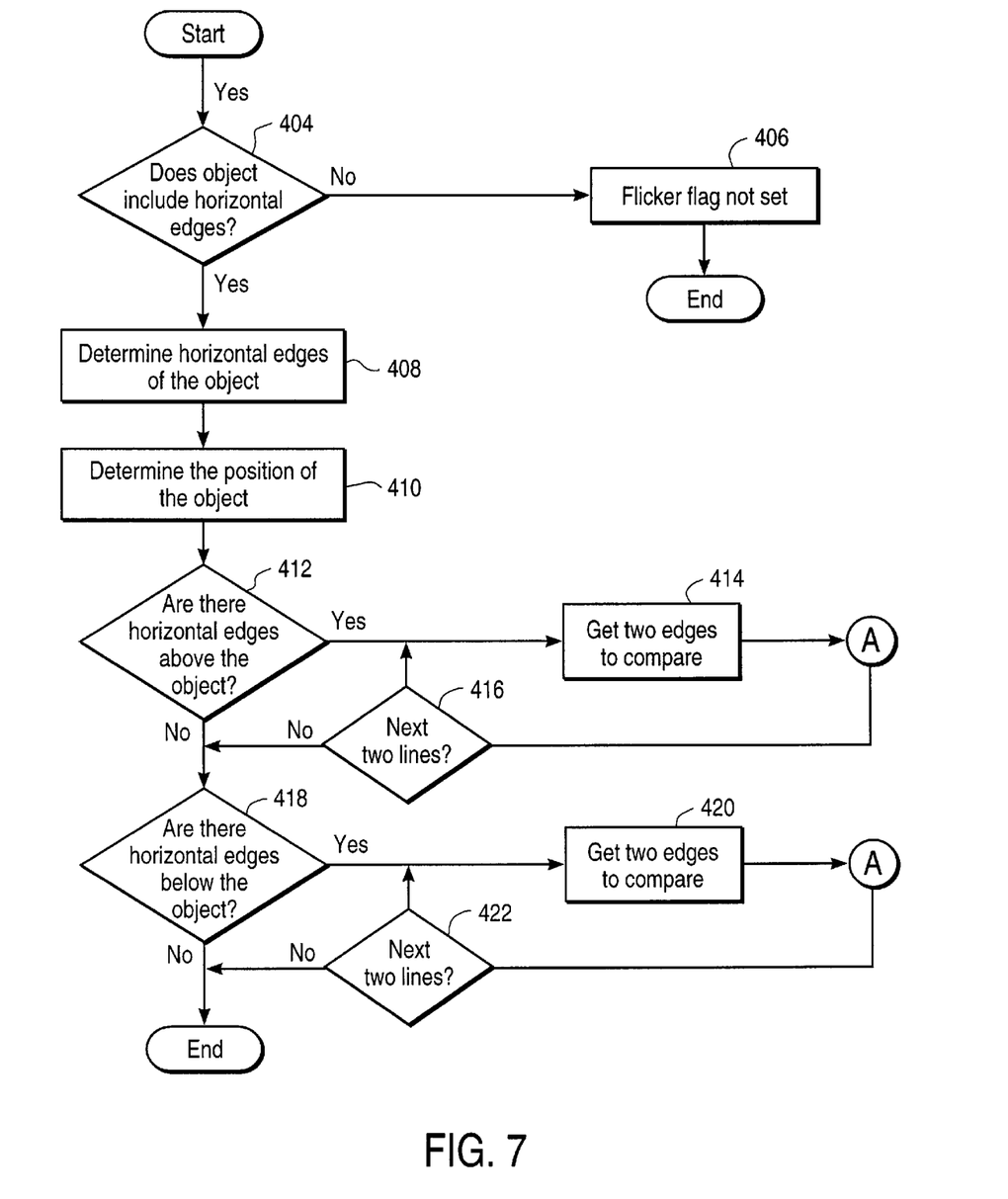
FIG. 7 shows a flowchart of one embodiment of the present invention that determines if a graphical object will cause flicker.

FIG. 7 shows a flowchart of one embodiment of the present invention that determines if a graphical object will cause flicker. The system analyzes a graphical object (or window) that has been created or moved on the screen to determine if the graphical object will cause flicker. At step 404, the system determines if there are any horizontal edges in the graphical object. In a preferred embodiment, the system not only checks for horizontal edges in the graphical object but also compares the length of the edges to a length threshold. If a horizontal edge is not longer that the length threshold, the edge is not processed any further. For example, the letter "E" contains horizontal edges. However, the possible flicker produced by a normal-sized font is negligible so it may be more efficient to ignore the edges if they are shorter than the length threshold.

If there are no horizontal edges in the graphical object that should be processed, the graphical object will not produce flicker. At step 406, a flicker flag is not set (i.e., off). The flicker flag is used to indicate whether the graphical object will cause flicker when it is displayed. Although it is shown that a flag is not set, it is not necessary that a flag be used at all. For example, once the system has determined that the graphical object will not produce flicker, the system may just display the graphical object.

If there are horizontal edges in the graphical object, the system determines the horizontal edges of the graphical object at step 408. Step 408 may be performed concurrently with step 404. Once the horizontal edges of the graphical object are determined, the system determines the position the graphical object will be displayed on the screen at step 410.

The system checks whether there are any horizontal edges above the graphical object at step 412. If there are horizontal edges above the graphical object (e.g., from another graphical object), the system obtains a horizontal edge to compare to a horizontal edge of the graphical object at step 414. The system then compares the edges to determine if the edges will produce flicker. This process is described in more detail in reference to FIG. 8. In a preferred embodiment, only horizontal edges above the graphical object that are within the vertical proximity threshold are identified.

At step 416, the system checks if there are two more horizontal edges to compare. If there are, the system proceeds to step 414 to get the two edges for comparison. Otherwise, the system has checked for flicker above the graphical object.

The system then checks whether there are any horizontal edges below the graphical object at step 418. If there are horizontal edges below the graphical object, the system obtains a horizontal edge to compare to a horizontal edge of the graphical object at step 420. The system then compares the edges to determine if the edges will produce flicker which is described in more detail in reference to FIG. 8. In a preferred embodiment, only horizontal edges below the graphical object that are within the vertical proximity threshold are identified.

At step 422, the system checks if there are two more horizontal edges to compare. If there are, the system proceeds to step 420 to get the two edges for comparison. Otherwise, the system has checked for flicker both above and below the graphical object.

Figure 8:
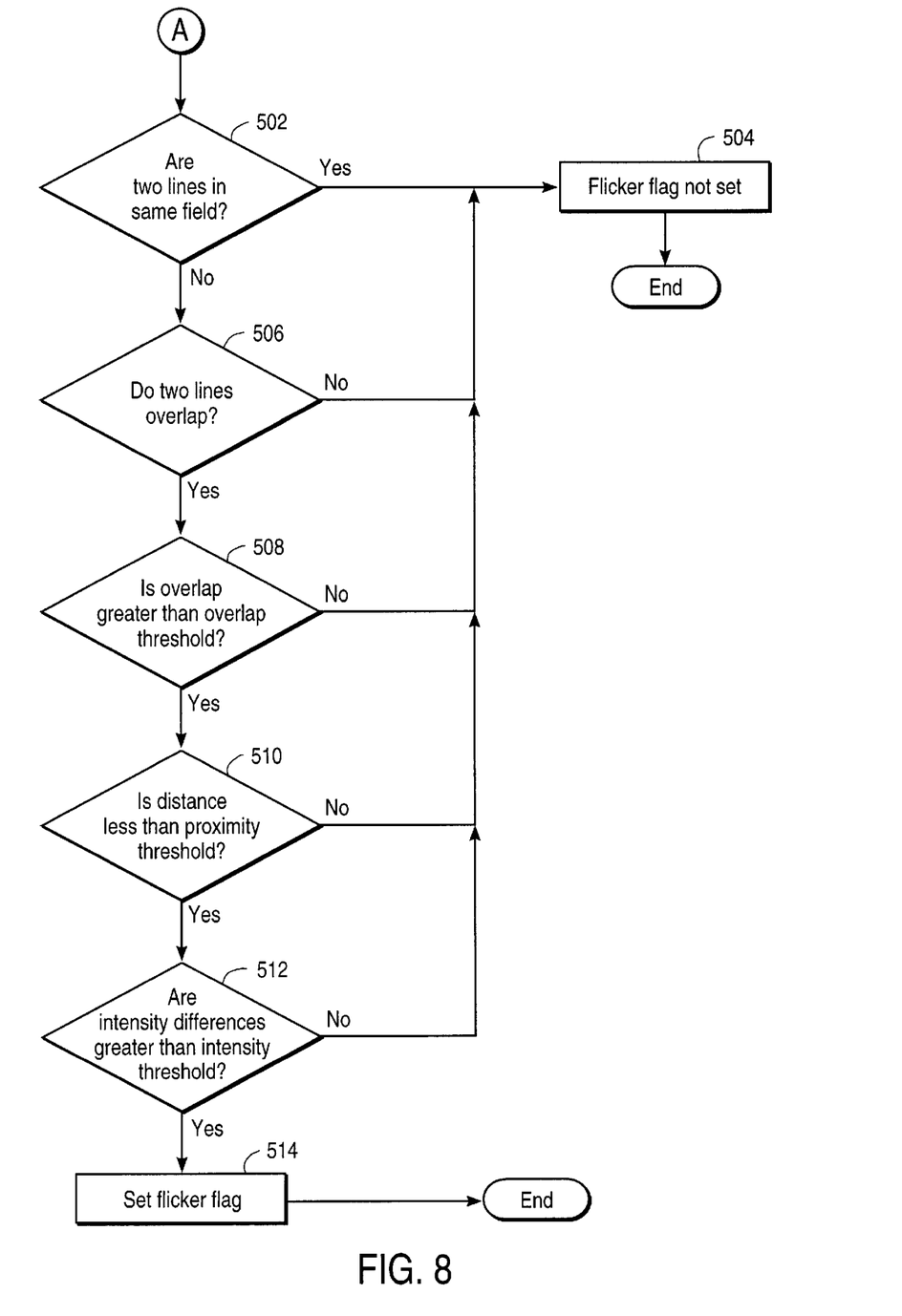
FIG. 8 shows a flowchart of analyzing flicker conditions of horizontal edges for use with FIG. 7.

FIG. 8 shows a flowchart of analyzing flicker conditions of horizontal edges for use with FIG. 7. At step 502, the system determines if the horizontal edges are in the same field. One method of determining if horizontal edges are in the same field is to test the least significant bits of the binary scan line numbers of the horizontal edges (e.g., by taking modulo 2). If the least significant bits are the same (e.g., scan line number 242 and 356 both have a 0 least significant bit and modulo 2), then the edges are in the same field; otherwise, the edges are in different fields. Another method is to count the number of intervening scan lines. If the number of intervening scan lines is odd, then the edges are in the same field; otherwise, the edges are in different fields. Another method is to calculate the difference between the numbered scan lines on which they reside. If the difference is even, then the edges are in the same field; otherwise, the edges are in different fields. If the edges are in the same field, flicker will not be produced and the flicker flag is not set at step 504.

If the horizontal edges are in different fields, the system determines if the edges horizontally overlap at step 506. If the edges overlap, the system determines if the overlap is greater than an overlap threshold at step 508. In one embodiment, the overlap threshold is a user-defined variable. If the edges do not overlap or the overlap is not greater than the overlap threshold, flicker will not be produced and the flicker flag is not set at step 504.

If the horizontal edges overlap by more than the overlap threshold, the system determines if the vertical distance between the edges is less than a proximity threshold. In one embodiment, the proximity threshold is a user-defined variable. If the vertical distance between the edges is not less than the proximity threshold, flicker will not be produced and the flicker flag is not set at step 504.

If the vertical distance between the horizontal edges is less than the proximity threshold, the system determines if the differences in luminous intensity (or chroma-luminance in some embodiments) between the edges and the intervening background are the same sign and the absolute value of the differences are both greater than an intensity threshold. In one embodiment, the intensity threshold is a user-defined variable. The luminous intensity of each edge is compared to the luminous intensity of the intervening background to produce a difference. If the difference in luminous intensity between one of the edges and the background is not greater than the intensity threshold, flicker will not be produced and the flicker flag is not set at step 504. Flicker is caused by the transition of luminous intensity values on the interlaced display device.

At step 514, the flicker flag is set (i.e., on) as the horizontal edges will produce flicker when displayed. Although it is shown that a flag is set, it is not necessary that a flag be used at all. For example, in one embodiment, once the system has determined that the horizontal edge of the graphical object will produce flicker, the system just displays an edge in a different field. Constraining the edge in a different field will not produce flicker and will not unnecessarily reduce the resolution of the display. The edge may be displayed on the horizonal scan line above or below the scan line on which it was originally positioned.

For illustration purposes, the present invention is described an analyzing horizontal edges of objects as they interact with horizontal edges outside the object. However, objects themselves are usually composed from lines, edges and strips. The internal horizontal edges of graphical objects may be similarly analyzed for flicker conditions as the internal graphical elements of the object are created. For example, when a horizontal strip is created, the two edges of the strip may be analyzed to determine if they will interact with other horizontal edges. Additionally, with horizontal strips, the horizontal strip itself may separate two horizontal edges in the background that interact to produce flicker as described previously in reference to graphical object 304 in FIG. 6. Testing for flicker conditions can be done interactively or as a post design rule check depending on the application program. In one embodiment, the system indicates to the user that a horizontal edge of a graphical object being created will produce flicker so the user may specify what action should be taken. For example, a graphical drawing program or icon editor may be creating an image that will be displayed on an interlaced screen.

Once the system indicates flicker will be produced, the user's choices may include displaying the edge in a different field, changing the luminous intensity (or chroma-luminance) of the edge, changing the shape, size or location of the graphical object, and the like. Additionally, the user may also specify to display the edge at the position that produces flicker. In this manner, internal horizontal edges may be checked for flicker when a graphical object is created.

Figure 9:
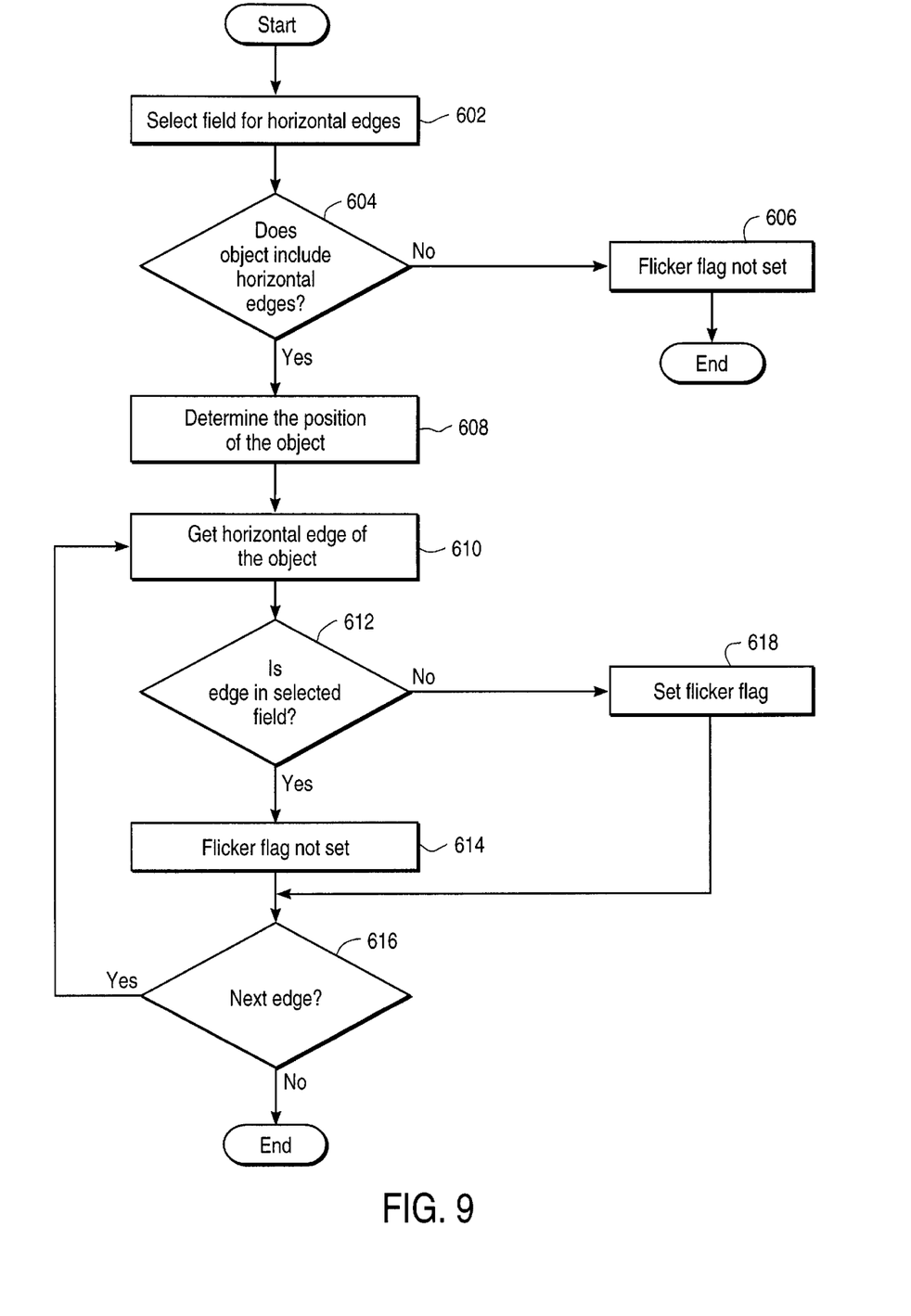
FIG. 9 shows a flowchart of another embodiment of the present invention that reduces flicker caused by graphical objects.

FIG. 9 shows a flowchart of another embodiment of the present invention that reduces flicker caused by graphical objects. If the overlap, proximity, and intensity thresholds are set strict enough, the above simplifies to the case where all horizontal edges which are lighter than the adjacent background will be in one selected field (e.g., odd field). Conversely, all horizontal edges which are darker than the adjacent background will be in the other field (e.g., even field). Additionally, if all the horizontal edges of graphical objects are darker (or light) than the background, flicker may be reduced by constraining all horizontal edges of graphical objects to be in the same field.

For simplicity, the following will describe constraining all horizontal edges to the same field; however, horizontal edges that are darker than the background may be constrained to one field and horizontal edges that are lighter than the background may be constrained to the other field by an extension of these principles. At step 604, the system selects a field on which all the horizontal edges of graphical objects will be displayed.

The system determines if there are any horizontal edges in the recently created or moved graphical object at step 604. In a preferred embodiment, the system not only checks for horizontal edges in the graphical object but also compares the length of the edges to a length threshold. If a horizontal edge is not longer that the length threshold, the edge is not processed any further. If there are no horizontal edges in the graphical object, the graphical object will not produce flicker and a flicker flag is not set at step 606.

If there are horizontal edges in the graphical object, the system determines the position the graphical object will be displayed on the screen at step 608. The system then obtains a horizontal edge of the graphical object at step 610. If, at step 614, the horizontal edge is in the field selected to display horizontal edges, the edge will not produce flicker and the flicker flag is not set at step 614. The system checks if there is another horizontal edge of the graphical object to process at step 616. If there is, the system gets the horizontal edge at step 610 and processes the edge.

If the horizontal edge is not in the field selected to display horizontal edges, the flicker flag is set at step 616. The flicker flag may be utilized as described above. Therefore, the flicker flag may be used to indicate the flicker condition to a user or application. Additionally, the system may just display the horizontal edge in the field selected to display horizontal edges either above or below its original scan line.

Although the embodiment shown in FIGS. 7 and 8 is very flexible and retains more resolution, the embodiment shown in FIG. 9 is very efficient and makes it easier for an application program to check for a flicker condition. Embodiments of the present invention may be made a part of an application program, operating systems, software drivers, and the like. For example, the operating system may have functions for creating and moving graphical objects, including window borders, without producing flicker on an interlaced display device.

In a preferred embodiment, all the flicker conditions are evaluated when an object is created. The internal horizontal edges of an object are checked to see if they will cause flicker. Also, all the outer horizontal edges are constrained to be in the same field. When an object is displayed or moved, the horizontal edges of the object are checked to see if the edges will cause flicker because the edges are in a different field than edges of a neighboring object. Flicker is then avoided by moving the object where possible. Thus, combinations of the methods of the present invention may be utilized in the same system as follows.

Figure 10:
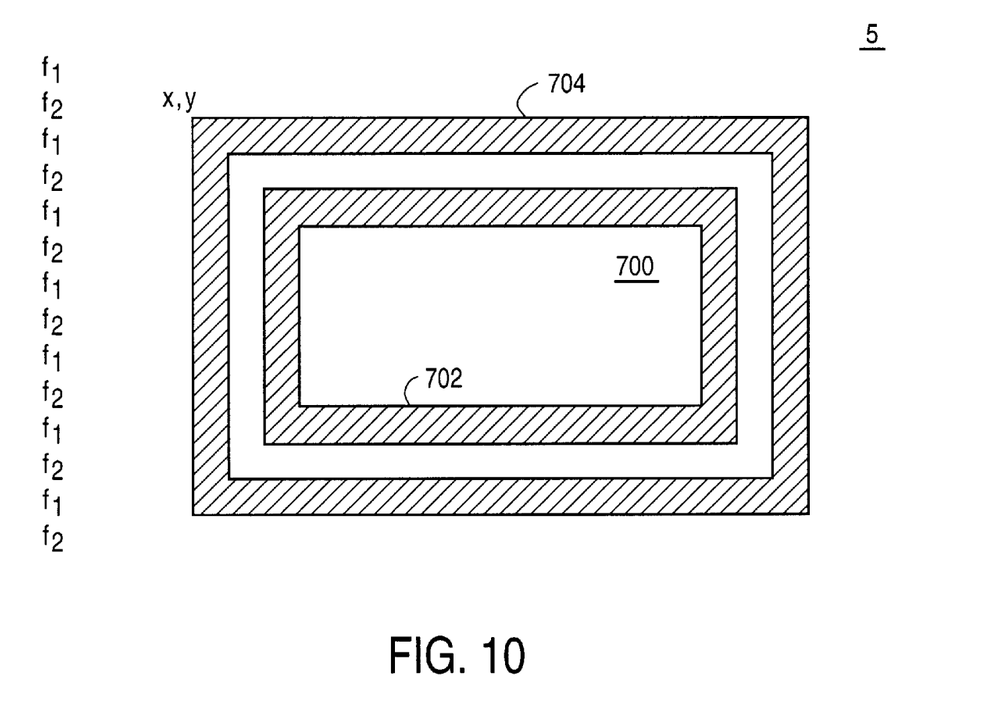
FIG. 10 is a screen including a window with two borders.

FIG. 10 is a screen including a window having two borders. A window 700 has a inner border 702 and an outer border 704. For simplicity, the information at the center of the window is not shown. Since horizontal edges that are in the same field do not result in flicker, the window has been created so that the inner and outer borders are in the same field $f_1$. For example, the window may have been created using the embodiment shown in FIGS. 7 and 8 which could have been used to also check the internal horizontal edges of the window (not shown). Once the window has been created, the system may insure that the window does not produce flicker by positioning the window in the same field as other objects according the embodiment shown in FIG. 9. This embodiment positions the window in a selected field.

Still referring to FIG. 10, the system may constrain the horizontal edges to be in a selected field in another embodiment. Assume that the position of window 700 is determined by the top left coordinates (x,y), where x specifies the horizontal position and y specifies the vertical position. If y indicates the binary value of the vertical position of the object, the system can constrain the window to be in the selected field (e.g., even) by forcing the least significant bit to be always 0. This can be done by taking the y value and performing an integer-divide-by-2 followed by multiply-by-2. In assembly language this can also be accomplished by doing a shift right followed by a shift left on the y or by doing a logical AND with 0 to the least significant bit of y. Thus if y=5, then y will be set to 4. In this manner the system constrains the window to be in the selected field. To constrain the window to be in the other field, the least significant bit is always forced to a 1. This can be done by adding 1 after the least significant bit has been forced to a 0 or doing a logical OR with 1 to the least significant bit of y. This embodiment provides an efficient method for constraining the horizontal edges of graphical window and other objects to be in the selected field. Additionally, the system can insure that the window is resized to have inner and outer borders that are in the same field by constraining the height of the window to be odd. The window's double borders are constrained to be in the same field by constraining the border height to be also odd. Once the object is created on the screen so that the horizontal edges are in the selected field, y can be changed by an even number of lines to keep the horizontal edges in the selected field.

This embodiment may also provide for graphic drawing routines which will place horizontal edges in the selected field. For instance a line draw function might define (x1,y1) and (x2,y2) as two end points of a line. If y1=y2, the function can force the least significant bit of both y1 and y2 to be either 0 or 1 to constrain the line to be placed on the selected field. Similarly, a rectangle draw function, which could be a filled rectangle or bordered rectangle, may define (x1,y1) and (x2,y2) as the top-left and right-bottom corners of a rectangle. The function can force the least significant bit of both y1 and y2 to be either 0 or 1 to constrain the edges of the rectangle to be in the selected field. Graphic drawing programs and icon editors might use these functions to create objects with horizontal edges, while other objects can be created without the selected field restriction. The composite object typically has a handle (x,y) which positions the object on the screen. In order to place the horizontal edges of the object on the selected field of the screen, the least significant bit of y is set to either 0 or 1.

It should be readily apparent that the same analysis would apply to a light border on a dark background and a dark border on a light background. All the horizontal edges which are lighter than the contiguous background will be in one selected field (e.g., odd field). Conversely, all horizontal edges which are darker than the adjacent background will be in the other field (e.g., even field).

When horizontal edges are forced to be in a selected field, horizontal strips that used to touch may have an intervening scan line. However, if the height of one horizontal strip is increased by one scan line so the horizontal strips touch, that horizontal strip will consist of an even number of scan lines which may produce flicker. In order to reduce flicker, a higher priority is given to the horizontal strip that differs from the background luminous intensity by the greatest amount. The horizontal strip with the lower priority is changed. For example, if a black horizontal strip and gray horizontal strip originally touched on a white background, the black horizontal strip will have priority so the gray horizontal strip will be widened to touch the black horizontal strip. Additionally, if two horizontal strips are placed on the same scan line, a higher priority is given to the horizontal strip that differs from the background luminous intensity by the greatest amount.

If a border enclosed object is created (e.g., using a draw bordered rectangle function) which has horizontal edges on the selected field, then the enclosed area can be filled with colors having a magnitude of difference in chroma-luminance from the background less than that of the border. These rules for overlapping strips and area fill in conjunction with the line draw and rectangle draw functions forms a very useful tool for creating objects which do not cause flicker and can be a part of a graphic drawing program or an icon editor. This embodiment may be combined with other methods. For example, a window's borders and icons may be created and moved using an embodiment of the present invention, but inside the window an application might be running which does not use these rules, (e.g., a text editor).

The present invention may also provide an additional check for dynamic pictures. Horizontal edges that are moving on the screen generally do not produce flicker. Therefore, the system allows moving horizontal edges to occupy any field so that the edge moves smoothly (not jerky) because it is not constrained to move two scan lines at a time to reduce flicker.

While the above is a complete description of the preferred embodiments of the invention, various alternatives, modifications and equivalents may be used. It should be evident that the present invention is equally applicable by making appropriate modifications to the embodiments described above. For example, although software source and assembly code that implements the present invention is included in a Microfiche Appendix, the present invention may also be implemented in hardware. Therefore, the above description should not be taken as limiting the scope of the invention which is defined by the metes and bounds of the appended claims.

What is claimed is:

1. In a computer system, a method of reducing flicker on an interlaced display device, comprising the steps of:
   selecting a field of the interlaced display device to display selected horizontal edges of graphical objects displayed on the interlaced display device;
   providing a graphical object to be displayed on the interlaced display device; and
   constraining the selected horizontal edges of the graphical object to the selected field on the interlaced display device.

2. The method of claim 1, further comprising the step of selecting a horizontal edge of the graphical object if the horizontal edge is darker than a background luminous intensity.

3. The method of claim 1, further comprising the step of constraining horizontal edges of the graphical object that are lighter than the background luminous intensity to the other field of the interlaced display device.

4. The method of claim 1, wherein the vertical position of the graphical object is specified by a vertical coordinate, and the constraining step includes setting a least significant bit of the vertical coordinate to specify the selected field of the interlaced display.

5. A computer system, comprising:
 a computer having a memory;
 an interlaced display device coupled to the computer; and
 a program stored in the memory that constrains selected horizontal edges of a graphical object to one field on the interlaced display device in order to reduce flicker.

6. A computer system, comprising:
 means for selecting a field of the interlaced display device to display selected horizontal edges of graphical objects displayed on the interlaced display device;
 means for providing a graphical object to be displayed on the interlaced display device; and
 means for constraining the selected horizontal edges of the graphical object to the selected field on the interlaced display device.

7. A computer program product that reduces flicker on an interlaced display device, comprising:
 computer code that selects a field of the interlaced display device to display selected horizontal edges of graphical objects displayed on the interlaced display device;
 computer code that provides a graphical object to be displayed on the interlaced display device;
 computer code that constrains the selected horizontal edges of the graphical object to the selected field on the interlaced display device; and
 a computer readable storage medium that stores the computer codes.

8. A computer system comprising:
 a computer having a memory;
 an interlaced display device coupled to the computer; and
 a program stored in the memory that constrains horizontal edges of a graphical object to be in a selected field of the interlaced display device.

9. A graphical image created by a computer implemented method of reducing flicker on an interlaced display device, comprising the steps of:
 providing a graphical object to be displayed on the graphical image;
 selecting a field of the interlaced display device to display horizontal edges of graphical objects displayed on the interlaced display device; and
 constraining horizontal edges of the graphical object to the selected field of the interlaced display device.

10. A computer program or driver product that reduces flicker on an interlaced display device, comprising:
 code that selects a field of the interlaced display device to display horizontal edges of graphical objects displayed on the interlaced display device;
 code that receives as input a graphical object to be displayed on the interlaced display device;
 code that constrains horizontal edges of the graphical object to the selected field of the interlaced display device; and
 a computer readable medium that stores the codes.

11. In a computer system, a method of reducing flicker on an interlaced display device, comprising the steps of:
 providing one or more graphical objects to be displayed on the interlaced display device;
 identifying at least one pair of adjacent horizontal edges of one or more of the graphical objects; and
 constraining the identified pair of adjacent horizontal edges to a first field of the interlaced display device to reduce flicker on the interlaced display device.

12. The method of claim 11, wherein the first field is an even or odd field of the interlaced display device.

13. The method of claim 11, wherein the constraining step constrains all of the horizontal edges of all of the graphical objects to the first field.

14. The method of claim 11, further comprising the step of determining if flicker is produced when each of the pair of adjacent horizontal edges is in a different field and voiding the constraining step if the determining step is negative.

15. The method of claim 14, wherein the determining step includes the steps of:
 comparing a length of each of the pair of adjacent horizontal edges to a length threshold; and
 determining that flicker is not produced if either length is less than the length threshold.

16. The method of claim 14, wherein the determining step includes the steps of:
 comparing a horizontal overlap of the pair of adjacent horizontal edges to an overlap threshold; and
 determining that flicker is not produced if the horizontal overlap is less the overlap threshold.

17. The method of claim 14, wherein the determining step includes the steps of:
 comparing a distance between the pair of adjacent horizontal edges to a proximity threshold; and
 determining that flicker is not produced if the distance is greater than the proximity threshold.

18. The method of claim 14, wherein the determining step includes the steps of:
 comparing a difference between luminous intensity of each of the pair of adjacent horizontal edges to an intermediate luminous intensity; and
 determining that flicker is not produced if the difference is less than a luminous intensity threshold, or if the difference is of a different sign.

19. A computer system, comprising:
 a computer having a memory;
 an interlaced display device coupled to the computer; and
 a program stored in the memory that constrains two adjacent horizontal edges of one or more graphical objects to be in the same field of the interlaced display device.

20. A graphical image created by a computer implemented method of reducing flicker on an interlaced display device, comprising the steps of:
 providing one or more graphical objects to be displayed on the graphical image; and
 constraining two adjacent horizontal edges of one or more graphical objects to the same field of the interlaced display device.

21. A computer program or driver product that reduces flicker on an interlaced display device, comprising:
 code that receives as input one or more graphical objects to be displayed on the interlaced display device;

code that constrains two adjacent horizontal edges of one or more graphical objects to the same field of the interlaced display device; and a computer readable medium that stores the codes.

22. In a computer system, a method of reducing flicker on an interlaced display device, comprising the steps of:

selecting a field of the interlaced display device to display horizontal edges of graphical objects displayed on the interlaced display device;

providing a graphical object to be displayed on the interlaced display device; and constraining horizontal edges of the graphical object to the selected field of the interlaced display device.

23. The method of claim 22, wherein the constraining step includes an integer-divide-by-2 step and a multiply-by-2 step.

24. The method of claim 22, wherein the vertical position of the graphical object is specified by a vertical coordinate, and the constraining step includes setting a least significant bit of the vertical coordinate in order to specify the selected field of the interlaced display device.

25. In a computer system, a method of reducing flicker on an interlaced display device, comprising the steps of:

providing a graphical object to be displayed at a position on the interlaced display device;

identifying a first horizontal edge of the graphical object, the first horizontal edge positioned in a first. field of the interlaced display device, said display device operating with only two fields;

determining if the first horizontal edge of the graphical object will substantially contribute to flicker on the interlaced display device; and displaying the first horizontal edge of the graphical object in a second field of the interlaced display device that is different than the first field to reduce flicker on the interlaced display device.

26. The method of claim 25, wherein the testing step comprises the steps of:

taking the modulo 2 of scan line numbers of the first and second horizontal edges; and determining the first and second horizontal edges are in the same field of the interlaced display device if the modulo 2 of their scan line numbers are the same.

27. The method of claim 25, wherein the determining step comprises the steps of:

taking a difference in luminous intensity between the first horizontal edge and an intermediate luminous intensity;

taking a difference in luminous intensity between the second horizontal edge and the intermediate luminous intensity; and determining the first horizontal edge of the graphical object will not substantially contribute to flicker on the interlaced display device if signs of the differences are different.

28. The method of claim 27, further comprising the step of determining the first horizontal edge of the graphical object will not substantially contribute to flicker on the interlaced display device if the difference in luminous intensity for either the first or second horizontal edge is not greater than an intensity threshold.

29. The method of claim 25, wherein the first field is an even or odd field of the interlaced display device.

30. The method of claim 25, wherein the identifying step comprises the steps of:

comparing a length of the first horizontal edge of the graphical object to a length threshold; and processing the first horizontal edge of the graphical object if the length is greater than the length threshold.

31. The method of claim 25, further comprising the step of identifying a second horizontal edge.

32. The method of claim 31, wherein the graphical object includes the second horizontal edge.

33. The method of claim 31, wherein another graphical object or background includes the second horizontal edge.

34. The method of claim 31, wherein the determining step comprises the steps of:

testing whether the first and second horizontal edges are positioned in a same field of the interlaced display device; and determining the first horizontal edge of the graphical object will not substantially contribute to flicker on the interlaced display device of the first and second horizontal edges are positioned in the same field.

35. The method of claim 31, wherein the testing step comprises the steps of:

taking the modulo 2 of the scan line numbers of the first and second horizontal edges; and determining the first and second horizontal edges are in the same field of the interlaced display device if the modulo 2 of their scan line numbers are the same.

36. The method of claim 31, wherein the determining step comprises the steps of:

comparing a horizontal overlap of the first and second horizontal edges to an overlap threshold; and determining the first horizontal edge of the graphical object will not substantially contribute to flicker on the interlaced display device if the horizontal overlap is less than the overlap threshold.

37. The method of claim 31, wherein the determining step comprises the steps of:

comparing a vertical distance between the first and second horizontal edges to a proximity threshold; and determining the first horizontal edge of the graphical object will not substantially contribute to flicker on the interlaced display device if the vertical distance is greater than the proximity threshold.

38. The method of claim 31, wherein the determining step comprises the steps of:

comparing a difference in luminous intensity between the first horizontal edge and an intermediate luminous intensity to an intensity threshold;

comparing a difference in luminous intensity between the second horizontal edge and the intermediate luminous intensity to an intensity threshold; and determining the first horizontal edge of the graphical object will not substantially contribute to flicker on the interlaced display device if the difference in luminous intensity for either the first or second horizontal edge is not greater than the intensity threshold.

39. The method of claim 38, wherein luminous intensity is chromaluminance.

40. The method of claim 25, wherein the first horizontal edge is a horizontal edge of the graphical object and the method further comprises the step of selecting the second field to display horizontal edges of graphical objects displayed on the interlaced display device.

41. The method of claim 40, wherein the determining step comprises the steps of:

testing whether the first horizontal edge of the graphical object is positioned in the first field of the interlaced display device; and determining the first horizontal edge of the graphical object will substantially contribute to flicker on the interlaced display device if the first horizontal edge of the graphical object is positioned in the first field.

42. The method of claim 25, further comprising the step of setting a flag to indicate that the first horizontal edge of the graphical object will substantially contribute to flicker on the interlaced display device.

43. The method of claim 25, wherein the interlaced display device is a television or interlaced computer monitor.

44. In a computer system, a method of reducing flicker on an interlaced display device, comprising the steps of:
providing a graphical object to be displayed at a position on the interlaced display device;
identifying a first horizontal edge of the graphical object, the first horizontal line positioned in a first field of the interlaced display device, said display device operating with only two fields;
identifying a second horizontal edge positioned in a second field of the interlaced display device that is different than the first field;
comparing the first and second horizontal edges to determine if the first horizontal edge of the graphical object will substantially contribute to flicker on the interlaced display device; and
displaying the first horizontal edge of the graphical object in the second field of the interlaced display device to reduce flicker on the interlaced display device.

45. The method of claim 44, wherein the graphical object includes the second horizontal edge.

46. The method of claim 44, wherein another graphical object or background includes the second horizontal edge.

47. The method of claim 44, wherein the step of identifying the second horizontal edge comprises the steps of:
taking the modulo 2 of the scan line numbers of the first and second horizontal edges; and
determining the second horizontal edge is in the second field of the interlaced display device if the modulos are the same.

48. The method of claim 44, wherein an identifying step comprises the steps of:
comparing a length of a selected horizontal edge to a length threshold; and
identifying the selected horizontal edge for further processing if the length is greater than the length threshold.

49. The method of claim 44, wherein the comparing step comprises the steps of:
comparing a horizontal overlap of the first and second horizontal edges to an overlap threshold; and
determining the first horizontal edge of the first graphical object will substantially contribute to flicker on the interlaced display device if the horizontal overlap is greater than the overlap threshold.

50. The method of claim 44, wherein the comparing step comprises the steps of:
comparing a vertical distance between the first and second horizontal edges to a proximity threshold; and
determining the first horizontal edge of the graphical object will substantially contribute to flicker on the interlaced display device if the vertical distance is less than the proximity threshold.

51. The method of claim 44, wherein the comparing step comprises the step of:
comparing a difference in luminous intensity between the first horizontal edge and an intermediate luminous intensity to an intensity threshold;

comparing a difference in luminous intensity between the second horizontal edge and the intermediate luminous intensity to an intensity threshold; and
determining the first horizontal edge of the graphical object will not substantially contribute to flicker on the interlaced display device if the difference in luminous intensity for either the first or second horizontal edge is not greater than the intensity threshold.

52. In a computer system, a method of reducing flicker on an interlaced display device, comprising the steps of:
operating said interlaced display device with only two fields;
providing a first graphical object to be displayed at a position on the interlaced display device;
identifying a horizontal edge of the first graphical object, the first horizontal line of the first graphical object positioned in a first field of the interlaced display device;
identifying a horizontal edge of a second graphical object, the horizontal edge of the second graphical object positioned in a second field of the interlaced display device that is different than the first field;
comparing a horizontal overlap of the horizontal edges of the first and second graphical objects to an overlap threshold;
comparing a distance between the horizontal edges of the first and second graphical objects to a proximity threshold;
comparing a difference in luminous intensity between the horizontal edge of the first graphical object and an intermediate luminous intensity to an intensity threshold;
comparing a difference in luminous intensity between the horizontal edge of the second graphical object and an intermediate luminous intensity to an intensity threshold;
determining the horizontal edge of the first graphical object will substantially contribute to flicker on the interlaced display device if the horizontal overlap is greater than the overlap threshold and the vertical distance is less than the proximity threshold and both of the differences in luminous intensity are greater than the intensity threshold; and
displaying the horizontal edge of the first graphical object in the second field of the interlaced display device if it is determined that the horizontal edge of the first graphical object will substantially contribute to flicker on the interlaced display device.

53. The method of claim 52, wherein the step of identifying the second horizontal edge comprises the steps of:
taking the modulo 2 of the scan line numbers of the first and second horizontal edges; and
determining the second horizontal edge is in the second field of the interlaced display device if the modulos are different.

54. The method of claim 52, wherein an identifying step comprises the steps of:
comparing a length of a selected horizontal edge of a graphical object to a length threshold; and
identifying the selected horizontal edge for further processng if the length is greater than the length threshold.

55. A computer system, comprising:
a computer having a memory;
an interlaced display device coupled to the computer, said display device operating with only two fields;

at least one flicker condition for the interlaced display device stored in the memory; and a program stored in the memory that determines if a horizontal edge of a graphical object will substantially contribute to flicker upon reference to the at least one flicker condition, the program directing the interlaced display device to display the horizontal edge on a different field if the horizontal edge will substantially contribute to flicker.

56. A graphical image created by a computer implemented method of reducing flicker on an interlaced display device, comprising the steps of:

providing a graphical object to be displayed at a position on the graphical image;

identifying a horizontal edge of the graphical object, the horizontal edge positioned in a first field of the interlaced display device when displayed, said display device operative with only two fields;

determining if the horizontal edge of the graphical object will substantially contribute to flicker on the interlaced display device; and positioning the horizontal edge of the graphical object in a second field of the interlaced display device when displayed, the first and second fields being different.

57. A computer program or driver product that reduces flicker on an interlaced display device, comprising:

code that identifies a horizontal edge of a graphical object to be displayed on the interlaced display device operative with only two fields, the horizontal edge positioned in a first field of the interlaced display device when displayed;

code that determines if the horizontal edge of the graphical object will substantially contribute to flicker on the interlaced display device;

code that positioned the horizontal edge of the graphical object in a second field of the interlaced display device when displayed, the first and second fields being different; and a computer readable medium that stores the codes.

* * * * *